United States Patent
Di Bitonto et al.

(10) Patent No.: US 6,986,478 B2
(45) Date of Patent: Jan. 17, 2006

(54) MASHING TOOL

(75) Inventors: Anthony Di Bitonto, Brooklyn, NY (US); Wilfrido Loor, Brooklyn, NY (US); Kevin Lozeau, Brooklyn, NY (US)

(73) Assignee: Helen of Troy Limited, Bridgetown (BB)

( * ) Notice: Subject to any disclaimer, the term of this patent is extended or adjusted under 35 U.S.C. 154(b) by 75 days.

(21) Appl. No.: 10/429,148

(22) Filed: May 2, 2003

(65) Prior Publication Data

US 2004/0217220 A1    Nov. 4, 2004

(51) Int. Cl.
*A47J 43/00*    (2006.01)
(52) U.S. Cl. .................................... 241/169.2
(58) Field of Classification Search ................. D7/682; 241/169.2
See application file for complete search history.

(56) References Cited

U.S. PATENT DOCUMENTS

| | | | |
|---|---|---|---|
| 2,659,403 A | 11/1953 | Jones | |
| D203,858 S | 2/1966 | Hvale | |
| 3,352,340 A | 11/1967 | Hulterstrum | |
| 4,274,751 A | 6/1981 | Rector et al. | |
| 4,515,483 A | 5/1985 | Muller et al. | |
| D291,761 S | 9/1987 | Hoehne | |
| 5,009,510 A | 4/1991 | Gabriele | |
| 5,343,024 A * | 8/1994 | Prosise et al. | 219/730 |
| 5,421,651 A | 6/1995 | Pickering et al. | |
| 5,615,951 A | 4/1997 | Gabriele | |
| 5,818,016 A * | 10/1998 | Lorence et al. | 219/730 |
| D425,763 S | 5/2000 | Begley et al. | |
| 6,257,752 B1 * | 7/2001 | Browne | 366/129 |
| D447,392 S | 9/2001 | Johansson et al. | |

OTHER PUBLICATIONS

Web page, OXO International Catalog, "OXO GOOD GRIPS Smooth Potato Masher" (admitted prior art).

* cited by examiner

*Primary Examiner*—Mark Rosenbaum
(74) *Attorney, Agent, or Firm*—Seyfarth Shaw LLP

(57) ABSTRACT

A mashing tool is provided having a pair of arms attached to a mashing plate and a blade on each arm formed of a flexible resilient material in order to provide for scraping members and mixing members of the mashing tool. A non-scratch, noise-reduction, flexible coating is provided on the majority of the surfaces of the mashing tool and an improved fabrication method is provided thereby.

25 Claims, 2 Drawing Sheets

MASHING TOOL

The present invention pertains to a kitchen utensil and in particular a mashing tool for mashing food items.

BACKGROUND

Tools used in the kitchen for mashing food items such as potatoes are well known. Such mashing tools generally have a handle and a pair of arms connected to the handle and supporting therebetween a mashing surface opposite the handle. The mashing surface is generally formed with holes so that the food item being mashed may be extruded through such holes. Pushing down on the handle causes the mashing surface to apply a force to the food item and causes the food item to be compressed or mashed against a support surface, such as the bottom of a bowl in which the mashing is taking place. During mashing in a bowl or other vessel, some of the food item may become lodged onto the sides of the vessel. It is desirable to dislodge such displaced food and move it to the bottom of the vessel. In prior devices, it would be necessary to remove the mashing tool from the bowl and use a separate tool, such as a spatula or spoon, to then remove the displaced food items from the side of the bowl and to be relocated to the bottom of the bowl in order to be further mashed or use the side of the mashing surface, risking scraping and scratching the side of the bowl. The multiple steps of removing the mashing tool and locating a separate tool, such as a spatula and using the spatula to remove the food item from the sides of the bowl is time consuming and may delay the mashing process. Therefore, there is desired a mashing tool which provides for a means of both mashing and also removing displaced food items from the side of the bowl. It is also desirable for a mashing tool to provide a means of mixing the contents of a bowl.

Current mashing tools may have a flexible coating applied to some of the surfaces of the mashing tool. However, even with coatings of such flexible surfaces, the mashing tool generally is formed of a brittle, non-resilient material which may scratch the interior of a bowl in which mashing is occurring. Also, such rigid materials, such as metal, may cause much noise during the mashing process. Therefore, there is desired a mashing tool that reduces sticking and scratching and provides noise reduction when in operation.

SUMMARY

The present invention provides for a mashing tool comprising a handle, a pair of arms depending from the handle and a blade extending longitudinally along each arm and a mashing plate attached to each arm opposite the handle. In an embodiment, each blade may protrude perpendicularly from its arm. In an embodiment, a central area may be formed by the handle, arms and mashing plate and each blade is formed on the arms, opposite the central area. In an embodiment, a mashing width may be defined between outer edges of each of the arms and the mashing width is extended by the blades.

In an embodiment, the blades may be formed of a non-scratch coating and/or a noise reducing material. In an embodiment, a non-scratch coating and/or a noise reducing coating may be provided on the mashing member. In an embodiment, a non-scratch coating and/or a noise reducing coating may be provided on a mashing surface of the mashing member. In an embodiment, the blades may be formed of a silicone material. In an embodiment, a silicone coating may be provided on the mashing member. In an embodiment, a silicone coating may be provided on a mashing surface of the mashing member. In an embodiment, the silicone coating of the arms may be continuous with the silicone coating of the mashing member. In an embodiment, the arms and the mashing member may have a silicone coating injection molded thereon.

In a further embodiment, a kitchen tool is provided comprising a rigid arm, a work member attached to the arm and a silicone coating continuously covering the arm and the work member wherein the silicone coating provides a non-scratch surface. In an embodiment, the arm may include a blade extending therefrom and the blade formed by the silicone. In an embodiment, the work member may be a mashing plate. In an embodiment, the rigid member and the arm may be formed of a metallic material.

In a further embodiment, a method of making a kitchen tool comprising the steps of providing a metal work plate having an upright tab, welding a metal arm to the tab, injection molding silicone around the arm and work plate, forming a silicone blade longitudinally along the arm and attaching a handle to the arm at a position opposite the work plate. In an embodiment, the method may further comprise the steps of forming the handle of thermoplastic elastomer. In an embodiment, the silicone may completely and continuously coat all exposed surfaces of the work plate and the arm. In an embodiment, the method may further comprise the steps of attaching a second arm to the work plate. In an embodiment, the method may further comprise the steps of forming holes in the work plate so that it provides an extruding surface.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

DETAILED DESCRIPTION OF A PRESENTLY PREFERRED EMBODIMENT

Figure 1:
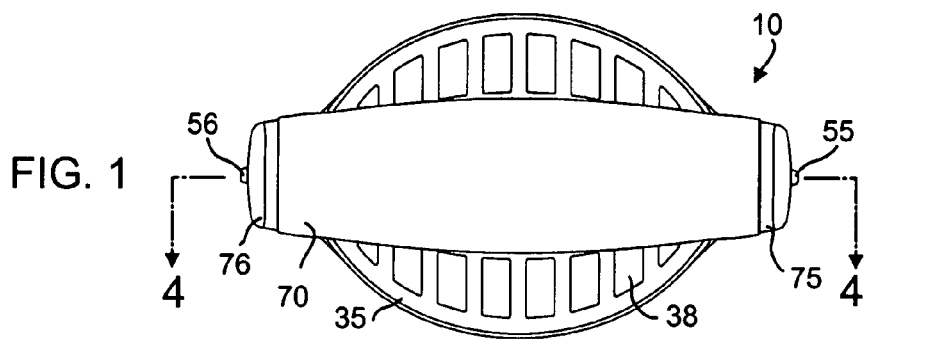
FIG. 1 is a top plan view of the mashing tool of the present invention.
Figure 2:
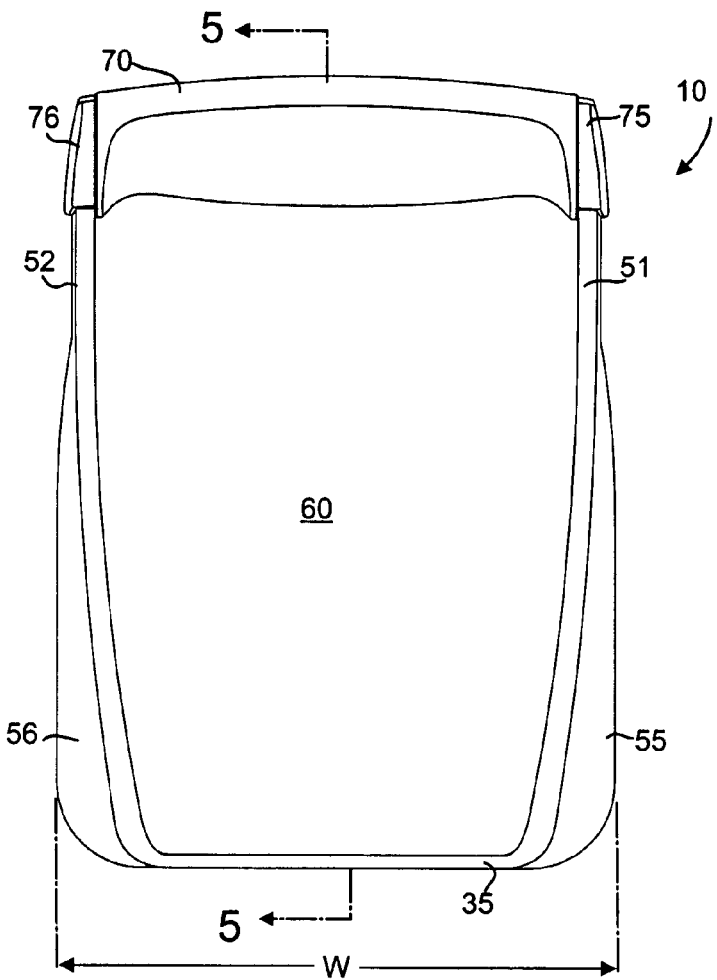
FIG. 2 is a front elevation view of the mashing tool of FIG. 1.
Figure 3:
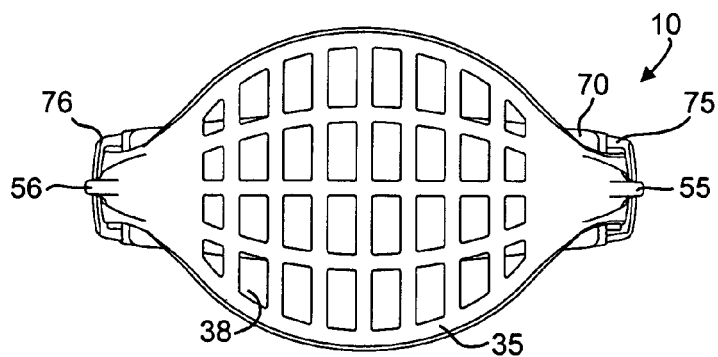
FIG. 3 is a bottom plan view of the mashing tool of FIG. 1.
Figure 4:
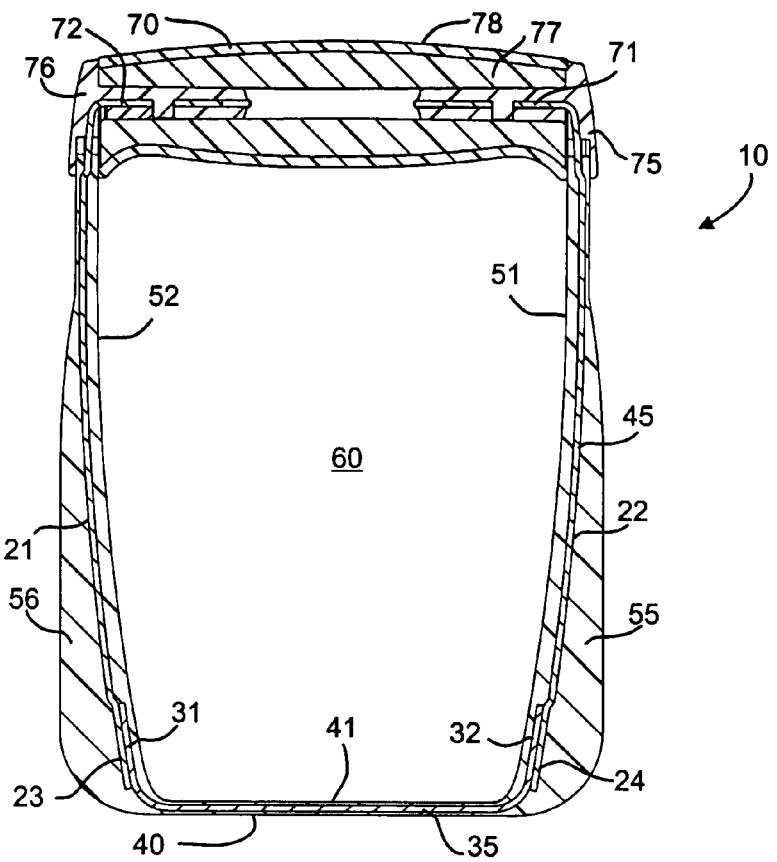
FIG. 4 is a sectioned view of the top of FIG. 1 taken at line 4—4.
Figure 5:
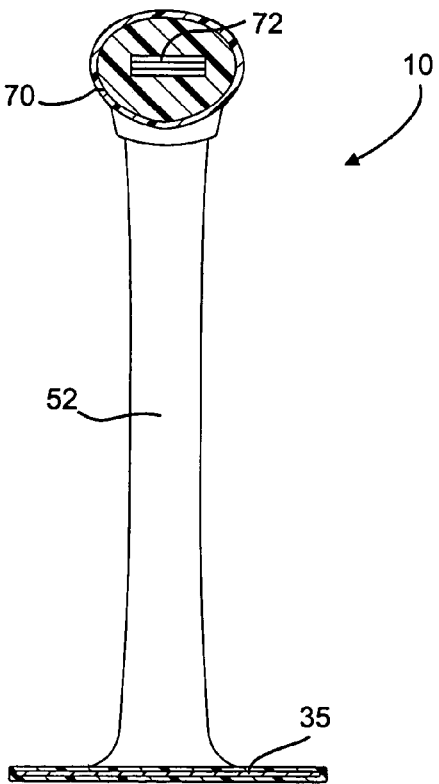
FIG. 5 is a sectioned view of the tope of FIG. 2 taken at line 5—5.

An embodiment of the invention is disclosed with regard to FIGS. 1–4. A mashing tool 10 includes a pair of flat arms 21, 22 which, in an embodiment, are formed of stamped metal. The arms respectively have distal ends 23, 24 which are respectively welded to upright tabs 31, 32 of a work member in the form of a mashing plate 35. In an embodiment, the work member may be a mashing member in the form of a plate used for mashing food items, such as potatoes or other foods. However, in alternate embodiments the work member may take a form other than a plate, such as a sinuous wire, and may be a work member to provide for other uses as a kitchen utensil. The mashing plate 35 includes multiple holes 38 formed therein. In an embodiment, the holes 38 may be generally rectangular in shape and dispersed across the entire working surface 40 of the mashing plate 35. In a preferred embodiment, each hole 35 extends between the working surface 40 or mashing surface and an interior surface 41.

When the arms 21, 22 are respectively welded to the tabs 31, 32 of the mashing plate 35, a generally U-shaped metal frame 45 is provided. In an embodiment, the mashing tool 10 will be assembled by forming the metal frame 45 and then insert or compression molding a polymer material around the frame 45. In an embodiment, silicone is used to mold around the frame 45. The silicone forms covered or coated arms 51, 52 and blades 55, 56 extending therefrom. In an embodiment, the silicone covers the entire surface area of the frame 45 so that it is permanently affixed and is easy to clean. Each blade 55, 56 extends longitudinally along the majority of its associated arm 51 or 52 and is flexible. In an embodiment, the blade 55, 56 may be broader adjacent the lower portion of the arm 51, 52 and having its greatest width at the area adjacent the mashing plate 35 and upstanding tabs 31, 32. The frame 45 forms a central area 60 that is completely open. In an embodiment, the blades 55, 56 extend from the arms 51, 52 respectively, in a direction away from the central area 60. The orientation of each blade 55, 56 is perpendicular to each arm 51, 52 that it extends from.

Therefore, it may be understood that each blade 55, 56 may be used to scrape excess food from the sides of a bowl or vessel (not shown) into which the mashing tool 10 is used and also to mix food present in a bowl. It may be further understood that having the blades 55, 56 formed of a polymer material, such as silicone the blades 55, 56, are flexible and resilient and may be placed against a side of a bowl and used to scrape the side of the bowl in order to remove extraneous food and to push the food toward the bottom of the bowl for further mashing without damaging, scratching or abrading the wall of the bowl. Therefore, it may be understood that the blades 55, 56 form a width W (see FIG. 2) that is equal to or greater than the largest width of the mashing tool 10 so that the blades 55, 56 may easily scrape against the sides of a bowl where mashing is occurring.

In an embodiment, the silicone is molded over the frame 45 to continuously and completely coat or cover the arms 21, 22 and the mashing plate 35. The silicone is formed having holes 38 corresponding to the holes formed in the metal mashing plate 35. The continuous covering of silicone over the entire frame 45 provides for a non-scratch, noise reduction, flexible, resilient surface formed over the entire working area of the mashing tool 10 that is easy to clean. In particular, the mashing plate 35 is covered on the working surface 40 with silicone, so that its mashing action against the bottom of a bowl will not scratch the bowl surface. Although silicone is used as a covering in an embodiment, other materials may be used to coat or cover the mashing tool 10 in order to provide a flexible, noise reduction or non-scratch coating thereon. As well, other means of applying flexible, noise reduction or non-scratch surfaces may be used. For example, a resilient pad may be applied with a fastener or adhesive to each action area of the mashing tool 10 in order to provide a non-scratch and/or noise reduction and/or flexible surface.

A handle 70 is attached to the arms 51, 52. In an embodiment, the arms 21, 22 include L-shaped fingers 71, 72, over which a polymer, such as polypropylene is injection molded in order to form the core 77 of handle 70. The handle core 77 may then be overmolded with a thermoplastic elastomer, such as Santoprene®, to form a soft, non-slip grip 78. A cap 75, 76 may be provided at each end of the handle 70. In an embodiment, the handle 70 is contoured so that it may be easily gripped by a hand. In alternate embodiments, other materials may be used other than thermoplastic elastomers. However, it is preferred that the handle be formed of a material that has some resilience in order that it may be easily gripped by a hand and used to apply significant force to the mashing tool 10.

In a preferred method of assembling and fabricating the mashing tool 10, the following steps are followed. A metal work plate or member such as a mashing plate 35 is provided having upright tabs 23, 24. Metal arms 21, 22 are welded to each tab 23, 24, respectively. Arms 21, 22 and mashing plate 35 form a generally U-shaped metal frame 45. The frame 45 is placed in a mold, and in an embodiment, silicone is injection molded around the arms 21, 22 and mashing plate 35. A pair of blades 55, 56 and insulated arms 51, 52 are formed. The assembly of the mashing tool 10 is completed by attachment of a handle 70. In an embodiment, the handle may be molded of Santoprene® around core 77 and fingers 71, 72 of the arms 21, 22. Finally, caps 75, 76 are attached at each end of the handle 70.

It should be understood that other methods of fabricating the mashing tool 10 may be used. For example, the blades 55, 56 may be formed separately from the arms 51, 52 and may be attached using fasteners or adhesive. In such alternate embodiments the blades 55, 56 may be coated in a separate process with a flexible, noise reduction or non-scratch coating. As well, the handle 70 and frame 45 may be attached to each other via other known means.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A mashing tool comprising:
a handle;
a pair of arms depending from the handle, each arm having a blade extending longitudinally there along and extending laterally outwardly therefrom and capable of scraping sides of a container; and
a mashing member extending between the arms, opposite the handle.

2. The tool of claim 1, wherein each blade protrudes perpendicularly from each arm.

3. The tool of claim 1, wherein the arms, the mashing member and the handle form a generally rectangular shaped frame providing an open central area therein and each blade is formed on a side of its associated arm, opposite the central area.

4. The tool of claim 1, wherein the blades are formed of a non-scratch material.

5. The tool of claim 1, wherein a non-scratch coating is provided on the mashing member.

6. The tool of claim 1, wherein anon-scratch coating is provided on a mashing surface of the mashing member.

7. The tool of claim 1, wherein the blades are formed of a flexible material.

8. The tool of claim 1 wherein a flexible, resilient coating is provided on the mashing member.

9. The tool of claim 1, wherein a flexible, resilient coating is provided on a mashing surface of the mashing member.

10. The tool of claim 1, wherein the blades are formed of a silicone material.

11. The tool of claim 1, wherein a silicone coating is provided on the mashing member.

12. The tool of claim 1, wherein a silicone coating is provided on a mashing surface of the mashing member.

13. The tool of claim 1, wherein a first silicone coating is provided on the arms and a second silicone coating is provided on the mashing member and the first and second silicone coatings are continuous with each other.

14. The tool of claim 1, wherein the arms and the mashing member have a silicone coating injection molded thereon.

15. The tool of claim 1, wherein the blades are formed of a material that provides noise reduction.

16. The tool of claim 1, wherein a noise reduction coating is provided on the mashing member.

17. The tool of claim 1, wherein a noise reduction coating is provided on a mashing surface of the mashing member.

18. A kitchen tool comprising:
a pair of rigid arms;
a work member attached to the arms, the work member providing a mashing plate; and
a silicone coating continuously covering the arms and the work member wherein the silicone coating provides a non-scratch surface.

19. The tool of claim 18, wherein at least one of the arms includes a blade extending therefrom and the blade formed by the silicone.

20. The tool of claim 18, wherein the mashing plate includes multiple holes therein.

21. The tool of claim 18, wherein the work member includes a working surface and an interior surface.

22. The tool of claim 18, wherein the silicone coating provides a flexible blade.

23. The tool of claim 18, wherein the arms and work plate form a generally U-shaped metal frame.

24. The tool of claim 18, further comprising a handle and wherein a cap is provided at each end of the handle.

25. The tool of claim 18, further comprising a work plate and wherein the work plate and arms are formed of a metallic material.

* * * * *